United States Patent
Chang et al.

(10) Patent No.: US 11,079,555 B2
(45) Date of Patent: Aug. 3, 2021

(54) FIBER MANAGEMENT ENCLOSURE FOR A FIBER OPTIC CONNECTOR ASSEMBLY AND METHOD OF USE

(71) Applicant: Senko Advanced Components Inc, Marlborough, MA (US)

(72) Inventors: Jimmy Jun Fu Chang, Worcester, MA (US); Kazuyoshi Takano, Tokyo (JP); Takuya Ninomiya, Natick, MA (US)

(73) Assignee: Senko Advanced Components, Inc., Marlborough, MA (US)

( * ) Notice: Subject to any disclaimer, the term of this patent is extended or adjusted under 35 U.S.C. 154(b) by 0 days.

(21) Appl. No.: 16/806,827

(22) Filed: Mar. 2, 2020

(65) Prior Publication Data
US 2020/0278504 A1 Sep. 3, 2020

Related U.S. Application Data

(60) Provisional application No. 62/812,986, filed on Mar. 2, 2019.

(51) Int. Cl.
*G02B 6/38* (2006.01)
*G02B 6/44* (2006.01)
*G02B 6/35* (2006.01)

(52) U.S. Cl.
CPC ......... *G02B 6/3878* (2013.01); *G02B 6/3885* (2013.01); *G02B 6/4472* (2013.01); *G02B 6/3562* (2013.01); *G02B 6/387* (2013.01); *G02B 6/3825* (2013.01); *G02B 6/3845* (2013.01); *G02B 6/3887* (2013.01); *G02B 6/3893* (2013.01); *G02B 6/4454* (2013.01); *G02B 6/4478* (2013.01)

(58) Field of Classification Search
None
See application file for complete search history.

(56) References Cited

U.S. PATENT DOCUMENTS

| | | |
|---|---|---|
| 4,047,797 A | 9/1977 | Arnold |
| 5,134,677 A | 7/1992 | Leung et al. |
| 5,471,555 A | 11/1995 | Braga et al. |
| 5,481,634 A | 1/1996 | Anderson et al. |
| 6,017,154 A | 1/2000 | Carlisle et al. |
| 6,072,932 A | 6/2000 | Bennett et al. |
| 6,196,733 B1 | 3/2001 | Wild |
| 6,259,856 B1 | 7/2001 | Shahid |
| 6,325,549 B1 | 12/2001 | Shevchuk |
| 6,419,399 B1 | 7/2002 | Loder et al. |
| 6,421,493 B1 | 7/2002 | Burek et al. |
| 6,464,404 B1 | 10/2002 | Robinson et al. |
| 6,571,048 B1 | 5/2003 | Bechamps et al. |

(Continued)

OTHER PUBLICATIONS

International Search Report and Written Opinion for Application No. PCT/US20/20684 dated Jun. 10, 2020, pp. 9.

*Primary Examiner* — Jerry Rahll

(57) ABSTRACT

A managed fiber optic connector assembly formed with an optical fiber management enclosure. The optical fiber management enclosure is formed with a back body as one-piece to form an integrated fiber optic management enclosure, or fiber optic management enclosure is inserted into the back body form a two-piece enclosure. The fiber management enclosure has a plural of channels, for example, an upper channel and a lower channel that retain, separate and guide a plural of optical fibers that are accepted through a port at a distal end of the managed fiber optic connector assembly.

20 Claims, 16 Drawing Sheets

(56) References Cited

U.S. PATENT DOCUMENTS

| | | |
|---|---|---|
| 6,623,173 B1 | 9/2003 | Grois et al. |
| 6,764,220 B2 | 7/2004 | Griffiths et al. |
| 6,789,959 B1 | 9/2004 | Conn |
| 6,962,446 B2 | 11/2005 | Greub et al. |
| 6,985,665 B2 | 1/2006 | Baechtle |
| 7,150,567 B1 | 12/2006 | Luther et al. |
| 7,281,856 B2 | 10/2007 | Grzegorzewska |
| 7,458,729 B2 | 12/2008 | Sasaki et al. |
| 7,758,389 B2 | 7/2010 | Kadar-Kallen et al. |
| 7,766,556 B2 | 8/2010 | Kachmar |
| 8,376,629 B2 | 2/2013 | Chine et al. |
| 8,408,810 B2 | 4/2013 | Hoffmann et al. |
| 10,162,129 B2 | 12/2018 | Smith et al. |
| 2001/0019654 A1 | 9/2001 | Waldron et al. |
| 2002/0003640 A1 | 1/2002 | Trezza |
| 2002/0106161 A1 | 8/2002 | Kiani |
| 2002/0114581 A1 | 8/2002 | Chen et al. |
| 2002/0150343 A1 | 10/2002 | Chiu et al. |
| 2002/0150353 A1 | 10/2002 | Chiu et al. |
| 2003/0133665 A1 | 7/2003 | Chiu et al. |
| 2004/0161207 A1 | 8/2004 | Chiu et al. |
| 2005/0018973 A1 | 1/2005 | Loder et al. |
| 2005/0117854 A1 | 6/2005 | Chiu et al. |
| 2006/0269194 A1 | 11/2006 | Luther et al. |
| 2007/0104425 A1 | 5/2007 | Larson et al. |
| 2009/0191738 A1 | 7/2009 | Kadar-Kallen et al. |
| 2010/0098381 A1 | 4/2010 | Larson et al. |
| 2011/0058772 A1 | 3/2011 | Bylander |
| 2011/0211329 A1 | 9/2011 | Dean, Jr. et al. |
| 2015/0277059 A1 | 10/2015 | Raven et al. |
| 2017/0212313 A1 | 7/2017 | Elenabaas et al. |
| 2018/0372964 A1 | 12/2018 | Vastmans et al. |
| 2019/0018201 A1 | 1/2019 | Takano et al. |

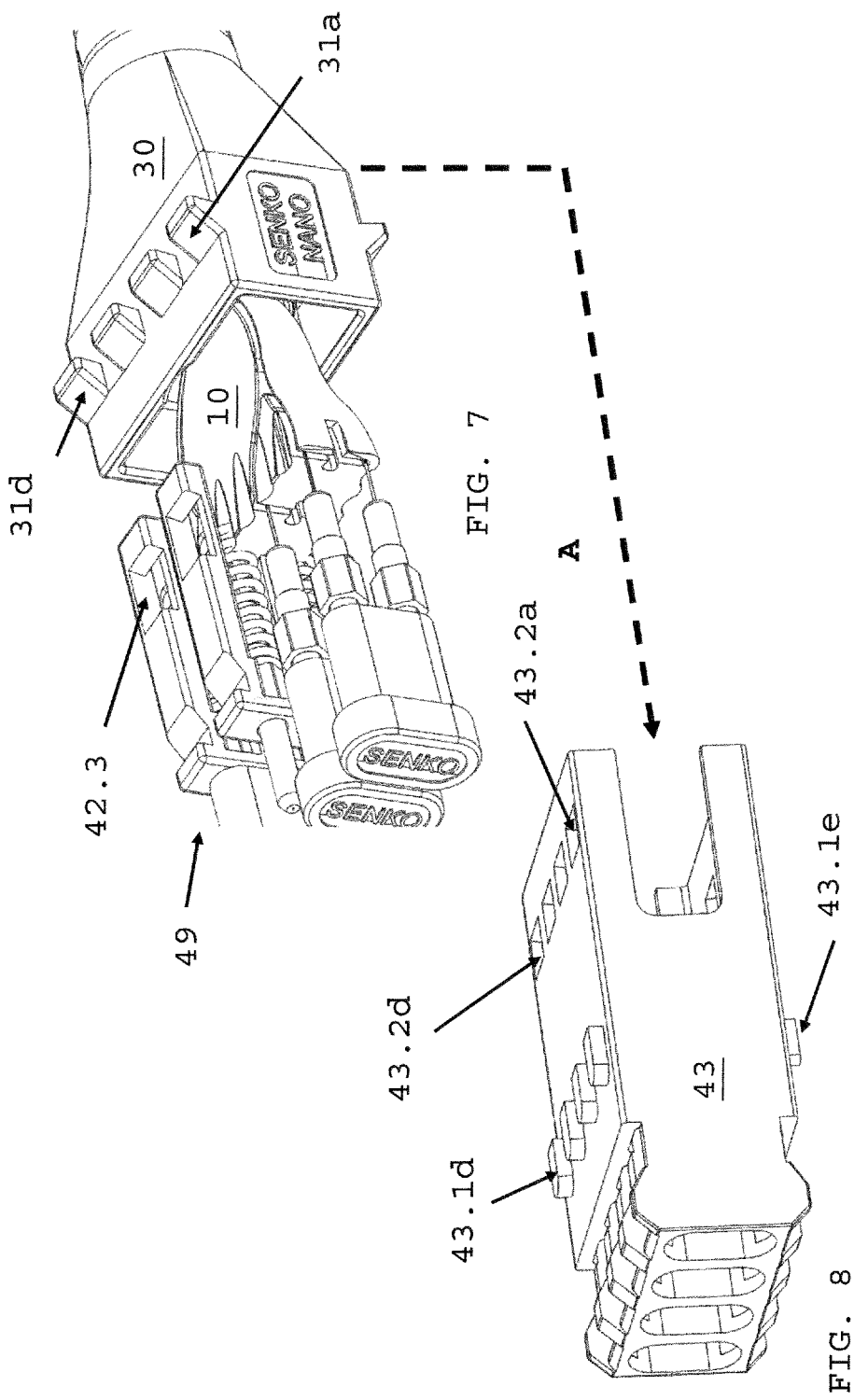

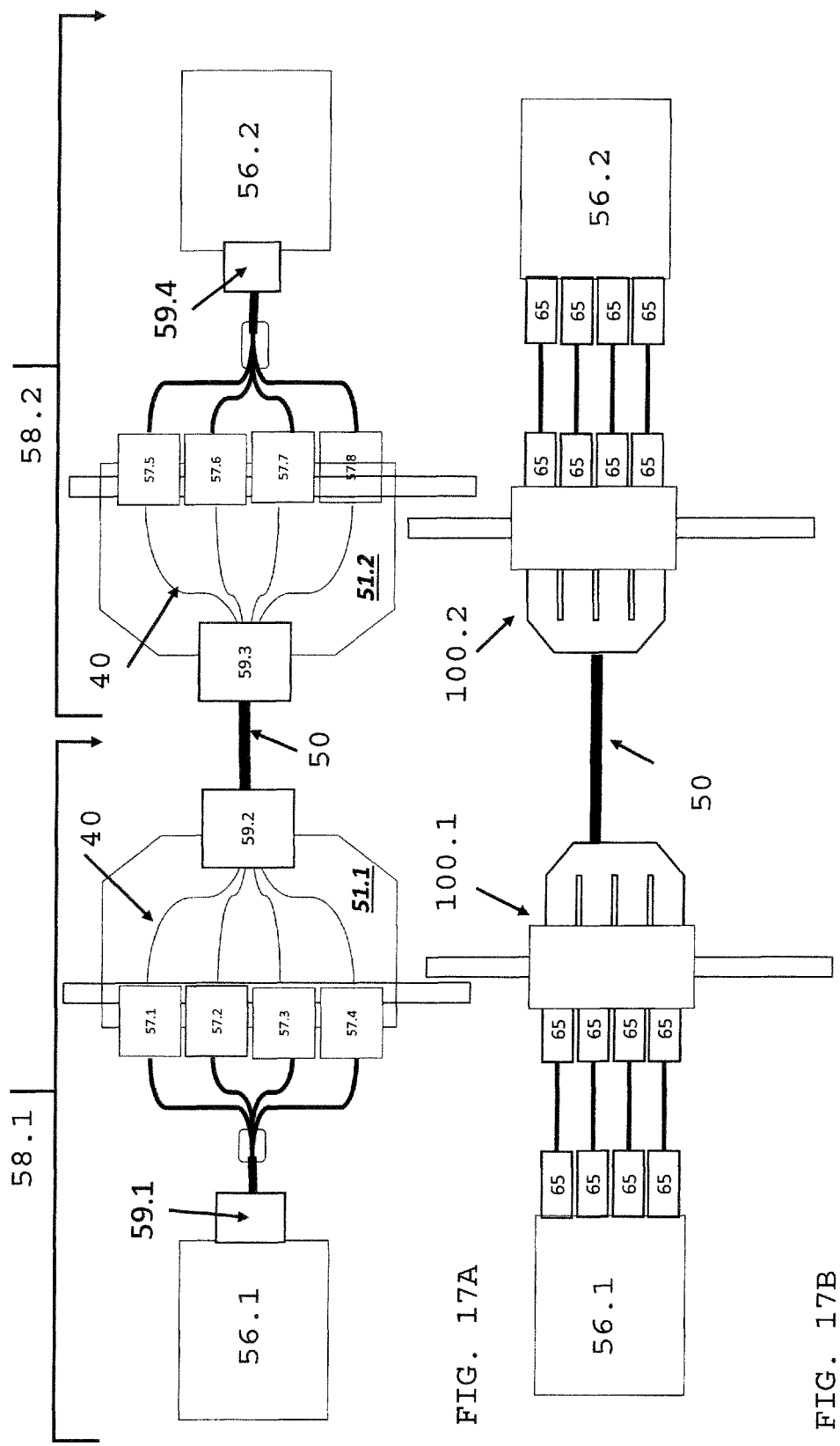

FIBER MANAGEMENT ENCLOSURE FOR A FIBER OPTIC CONNECTOR ASSEMBLY AND METHOD OF USE

RELATED APPLICATIONS

The present application claims priority from U.S. Patent Application 62/812,986 filed Mar. 2, 2019, titled "Fiber Management Enclosure with Uniboot for a Fiber Optic Connector", which is incorporated by reference.

BACKGROUND

The present disclosure relates generally to an enclosure or strain relief boot for helping to ensure incoming optical fibers are positioned next to each other without tangling or damage during use.

The prevalence of the Internet has led to unprecedented growth in communication networks. Consumer demand for service and increased competition has caused network providers need to find ways to improve quality of service while reducing cost.

Certain solutions have included deployment of high-density interconnect panels. High-density interconnect panels may be designed to consolidate the increasing volume of interconnections necessary to support the fast-growing networks into a compacted form factor, thereby increasing quality of service and decreasing costs such as floor space and support overhead.

In communication networks, such as data centers and switching networks, numerous interconnections between mating connectors may be compacted into high-density panels. Panel and connector producers may optimize for such high densities by shrinking the connector size and/or the spacing between adjacent connectors on the panel. However, in a high-density panel configuration, adjacent connectors and cable assemblies have a lot of incoming optical fibers that need to be organized with their fiber optic connectors so when removed from an adapter or receptacle the incoming fibers do not become tangled and break.

SUMMARY

According to one aspect of the present disclosure, there is provided an optical fiber flexible boot configured to hold a plural of optical fibers. The flexible or resilient boot is one-piece and configured with individual ports, slots or openings to secure the incoming plural of optical fibers from the fiber optic cable. The fiber optic cable may be a round cable with a plural of optical fiber and strength members or a flat cable or ribbon cable with a plural of optical fiber and strength members. Strength members include flexible wire or aramid fibers. The fibers are usually secured with about a crimp post that extends from a distal end or cable end of the fiber management enclosure.

In the present invention, the back body is molded as one-piece or two-piece including a cavity. The backbody is configured to accept the fiber management enclosure. The enclosure is received at a proximal end or open end of the back body. The distal end or cable end of the back body has crimp ring post molded as part of the back body main body. The crimp ring post can accept a deformable metal ring. When the optical fibers are passed through the passageway of the post, the strength members are positioned about the outer dimension of the post. The metal ring is crimped over the strength members. Alternatively, the post may be treaded to accept a screw cap that can bind the strength members between the inner threads of the screw cap and the threads of the post. Also, the cable jacket can be secured to post to improve pull-strength of the fiber optic cable during use. During use, a user may pull on the fiber optic cable to remove the fiber optic connector bundle from the adapter instead of pulling on the back body. Pulling on the cable increases stress on the optical fibers causing breaks or fractures leading to light loss or optical signal loss called insertion loss.

The fiber management enclosure has a main body with outer dimensions configured to be received and secured within the cavity of the back body. The distal end has main passageway that receives the plural of optical fiber from the fiber optic cable. Each optical fiber is fed through or positioned in a channel that branches off or extends from the input port for the optical fibers into one or more upper and lower channels. The upper channels then further branch off into lower channels that each secure one or more optical fibers in slots. To help ensure the optical fibers are maintained within the channels, the back body further comprises retention slots sized to accept the optical fiber without fracturing or breaking the optical fiber, and hold the optical fiber in place.

The fiber management enclosure replaces fiber optic connectors and cassette in a network system. A trunk line interconnects two network portions interconnect with fiber optic connectors such as MPO connector or multi-fiber push-on connector. The trunk line is a high capacity optical transmission line.

BRIEF DESCRIPTION OF THE DRAWINGS

FIG. 1A.1 is a side perspective view of a ferrule assembly;

FIG. 1A.2 is a rear perspective view of the ferrule assembly of FIG. 1A.1;

FIG. 7 is an exploded view of a plural of fiber optic assemblies, the fiber management enclosure, and the strain relief boot;

FIG. 8 illustrates a connector outer housing configured to receive and secure the partial assembly of FIG. 7;

FIG. 17A depicts a prior art a prior art network using cassettes to interconnect two networks by a trunk line, and FIG. 17B depicts the present invention used to interconnect two networks by a trunk line.

DETAILED DESCRIPTION

Figure 1:
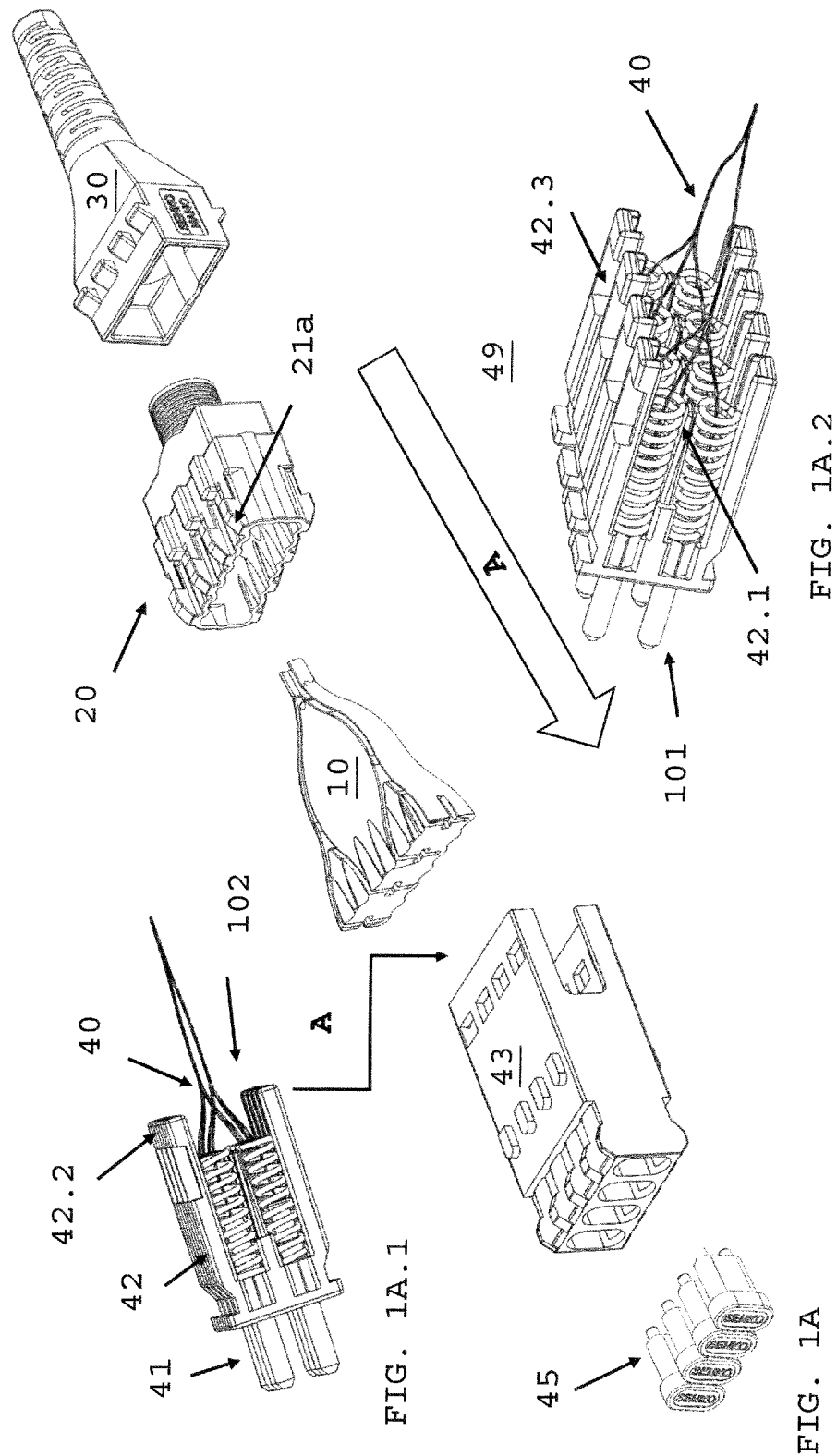
FIG. 1A is an exploded view of the present invention deployed to form a fiber optic connector.

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The following terms shall have, for the purposes of this application, the respective meanings set forth below.

A connector, as used herein, refers to a device and/or components thereof that connects a first module or cable to a second module or cable. The connector may be configured for fiber optic transmission or electrical signal transmission. A fiber optic connector has at least one ferrule with at least one optical fiber. The distal end of the ferrule is spliced or fused to an incoming optical fiber from an optical cable. The ferrule is secured with a ferrule flange and biased forward with a spring on the distal side of the flange and proximal a back body. The back body has a main body with a cavity configured to hold the spring and a portion of the ferrule assembly, and on the distal end is a post that can accept a portion of the fiber optic cable such as the strength members or cable jacket. The members or jacket or both is secured to the post with a crimp ring, and the proximal end of the back body has at least two latches that secure to the connector housing. A strain relief boot is added over the post. A fiber optical connector may have a ferrule with a plural of optical fibers with similar components.

A receptacle is an adapter with internal structure to secure a proximal end or ferrule end of a connector within a port or opening. An adapter allows a first and second connector to interconnect or oppose each other to transmit a light signal from one part of a cable assembly to another, as an example. A receptacle may be a transceiver with an opening to receive a connector.

A "fiber optic cable" or an "optical cable" refers to a cable containing one or more optical fibers for conducting optical signals in beams of light. The optical fibers can be constructed from any suitable transparent material, including glass, fiberglass, polymer optical fiber, or plastic. The cable can include a jacket or sheathing material surrounding the optical fibers. Between the outer sheath and the optical fiber are strands of strength members or tensile members. In addition, the cable can be connected to a connector on one end or on both ends of the cable.

A "fiber optic cable" or an "optical cable" refers to a cable containing one or more optical fibers for conducting optical signals in beams of light. The optical fibers can be constructed from any suitable transparent material, including glass, fiberglass, and plastic. The cable can include a jacket or sheathing material surrounding the optical fibers. In addition, the cable can be connected to a connector on one end or on both ends of the cable.

Various embodiments described herein generally provide connector assemblies having optical fiber connectors with push-pull tabs configured to allow a user to easily remove or insert connectors into adapters, such as adapters disposed on a high density panel without damaging surrounding connectors, accidentally disconnecting surrounding connectors, disrupting transmissions through surrounding connectors, and/or the like.

Figure 9:
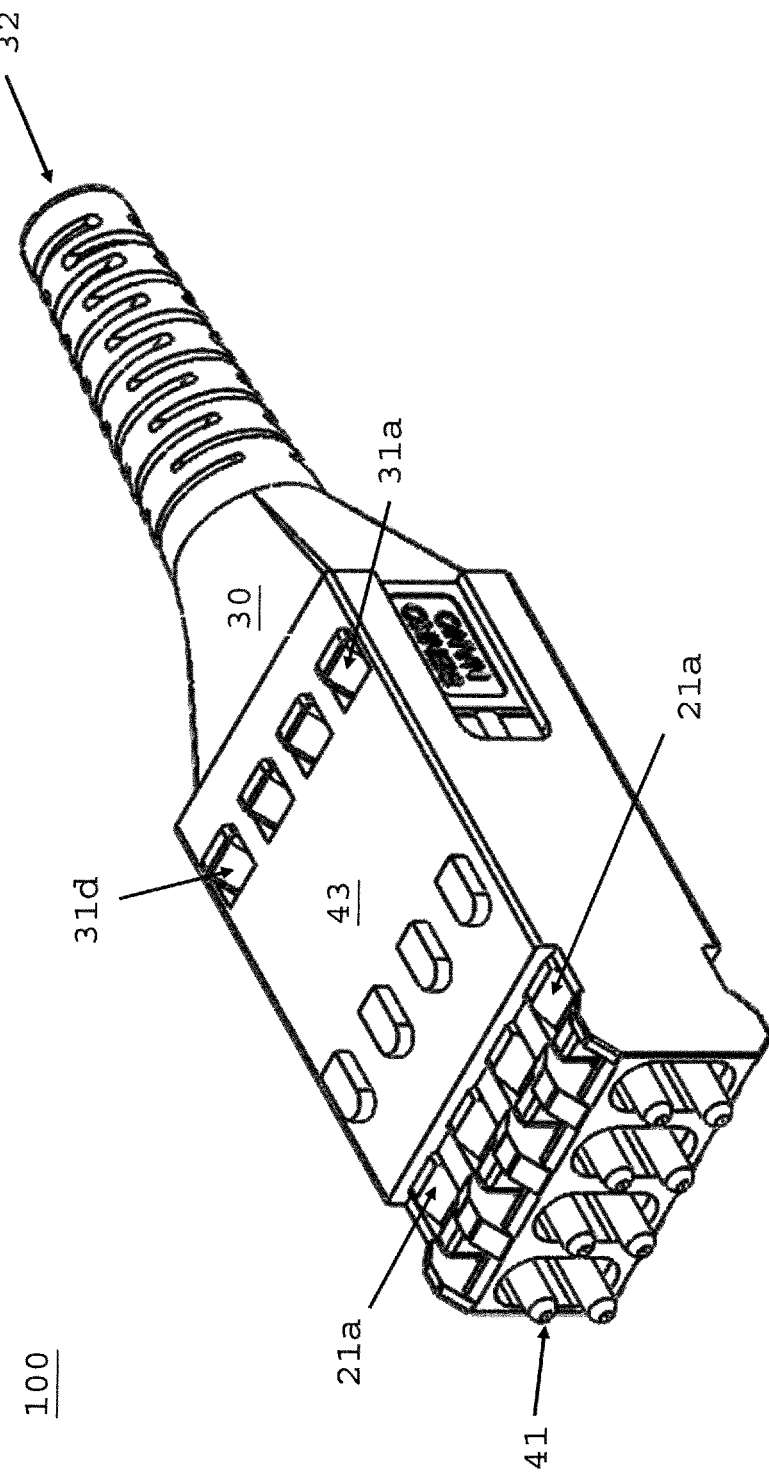
FIG. 9 is an assembled fiber optic connector deploying the fiber management enclosure of FIG. 13 or FIG. 15.

FIG. 1A depicts an exploded view of managed fiber optic connector (100), assembled in FIG. 9. Managed fiber optic connector (100) comprises strain relief boot (30), crimp ring (46), back body (20), optical fibers (40), optical fiber management enclosure (10), bias springs (44), front bodies (42) to hold ferrule (41) and the bias springs, outer connector housing (43) and optional dust cap (45) for each fiber optic connector. Connector (100) is assembled generally in the direction of the arrow "A". FIG. 1A.1 depicts a side perspective view of fiber optic assembly (49) of FIG. 1A.2. Distal end (102) shows a plural of optic fiber (40) and outer wall (42.2) front body (42). FIG. 1A.2 depicts rear view of fiber optic assembly (49) with ferrules (41) protruding from proximal end (101) of each front body (42). Middle wall (42.1) is secured within fiber optic management enclosure (10) at middle wall recess (11) (refer to FIG. 2).

Figure 2:
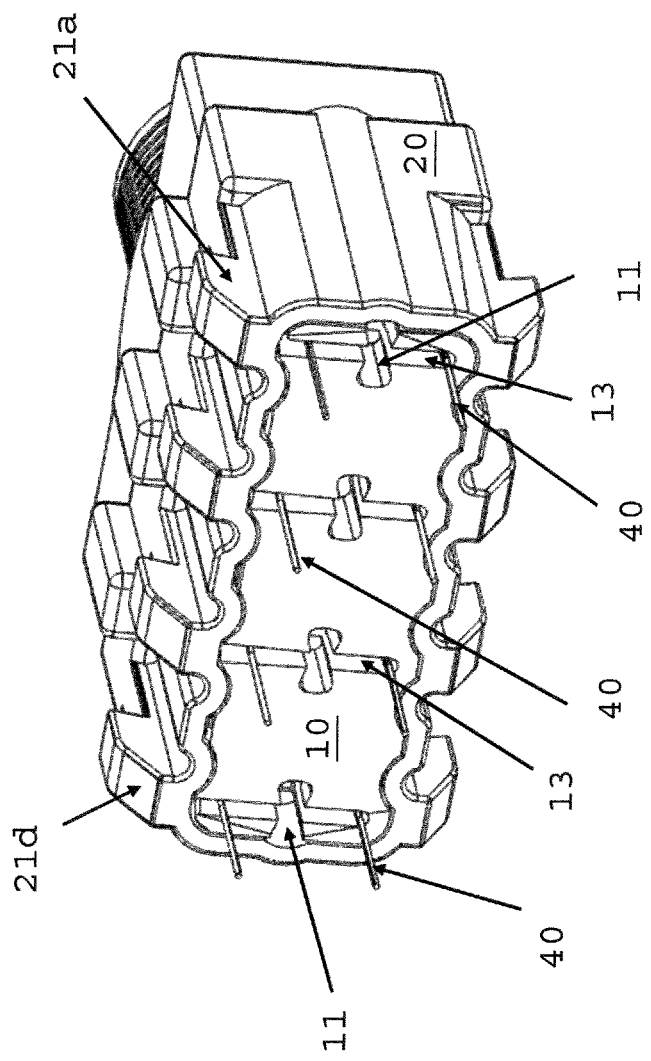
FIG. 2 is a perspective view of the proximal end of a back body with a fiber management enclosure therein according to the present invention.

FIG. 2 depicts back body (20) comprising main body with a cavity at proximal end. The cavity is configured to accept optical fiber management enclosure (10) of FIG. 13. Optical fiber management enclosure (10) supports a plural of optical fibers (40). Enclosure (10) helps ensure the optical fibers (40) do not become tangled or crossed with one another as can occur when deployed as shown in the prior art configuration of FIG. 11. At the proximal end of enclosure (10) are corresponding middle wall recess (11) that retains middle wall (49.1) of fiber optic assembly (49). Back body (20) ensures optical fibers (40) laid in upper channel (12) and in lower channel (13) or combined upper channel (12) and lower channel (13) or unitary channel (61) (refer to FIG. 15) holds or retains each optical fiber (40) within the channel to help prevent damage to the individual optical fibers (40) or tangling two or more optical fibers together resulting in optical fiber (40) damage or breakage. Back body (20) has a plural of front body hook (21) received in openings (42.3) at distal end of each corresponding front body (42). This is one way to secured back body (20) to connector outer housing (43).

Figure 3:
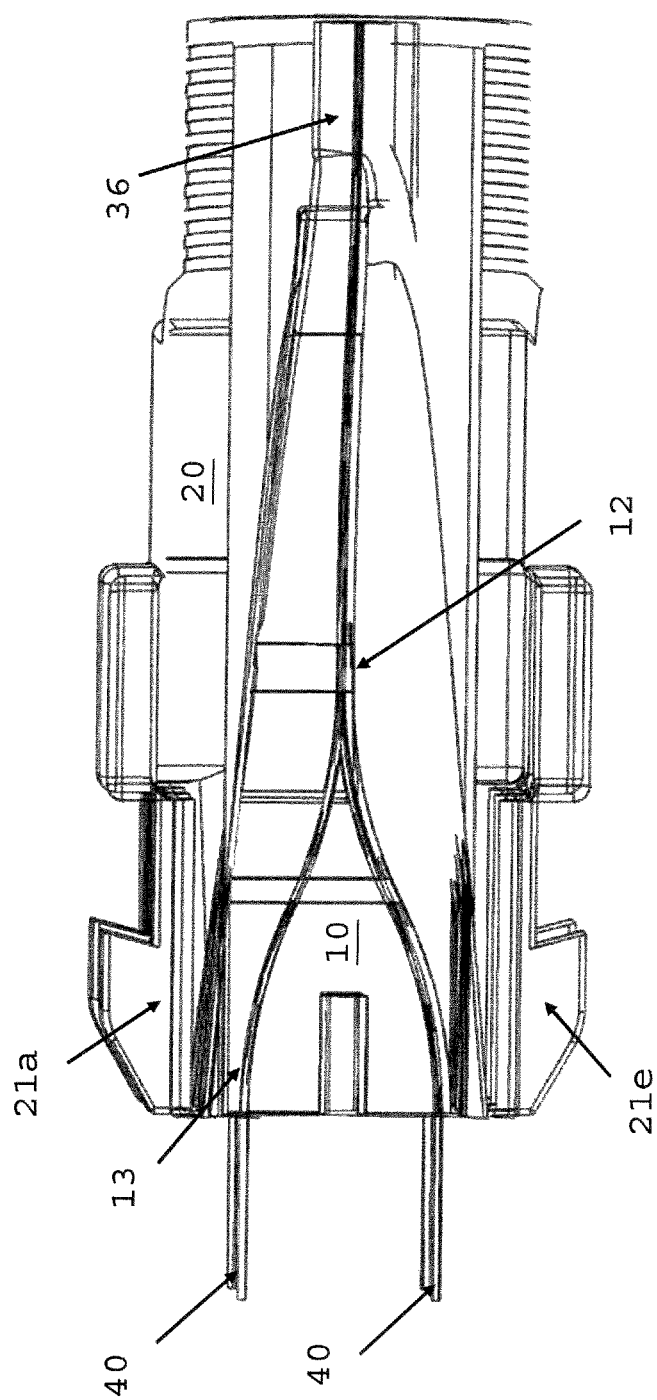
FIG. 3 is a cross-section of FIG. 2.
Figure 4:
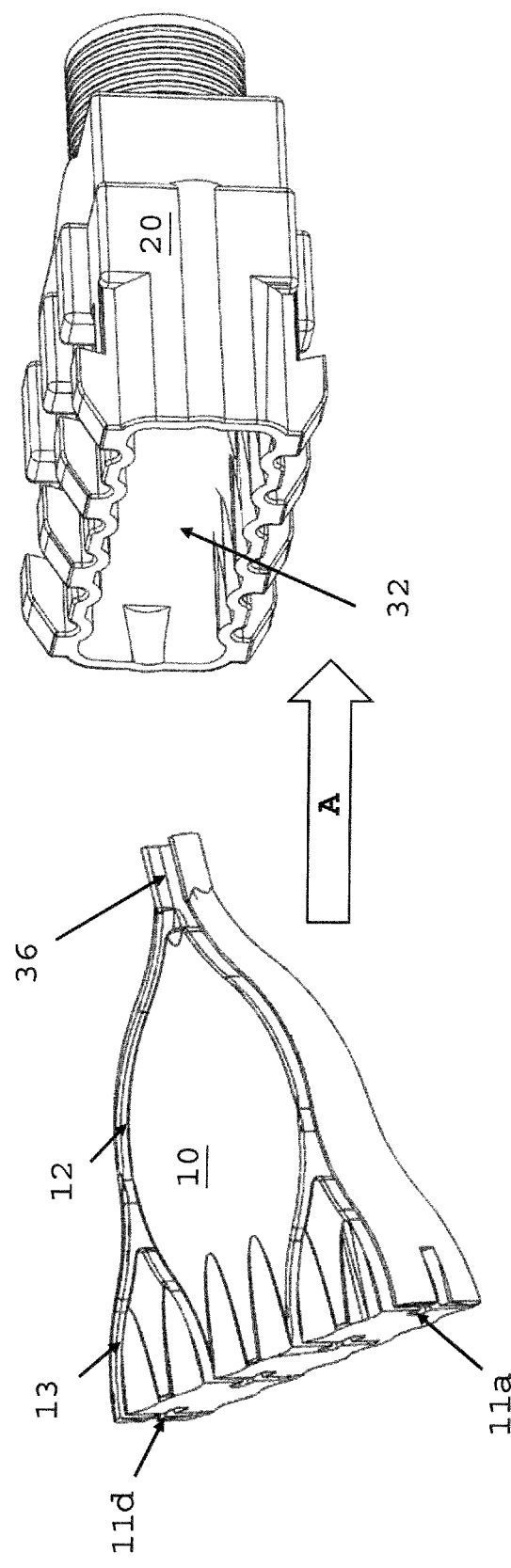
FIG. 4 is an exploded view inserting the fiber management enclosure into the back body of FIG. 2.
Figure 15:
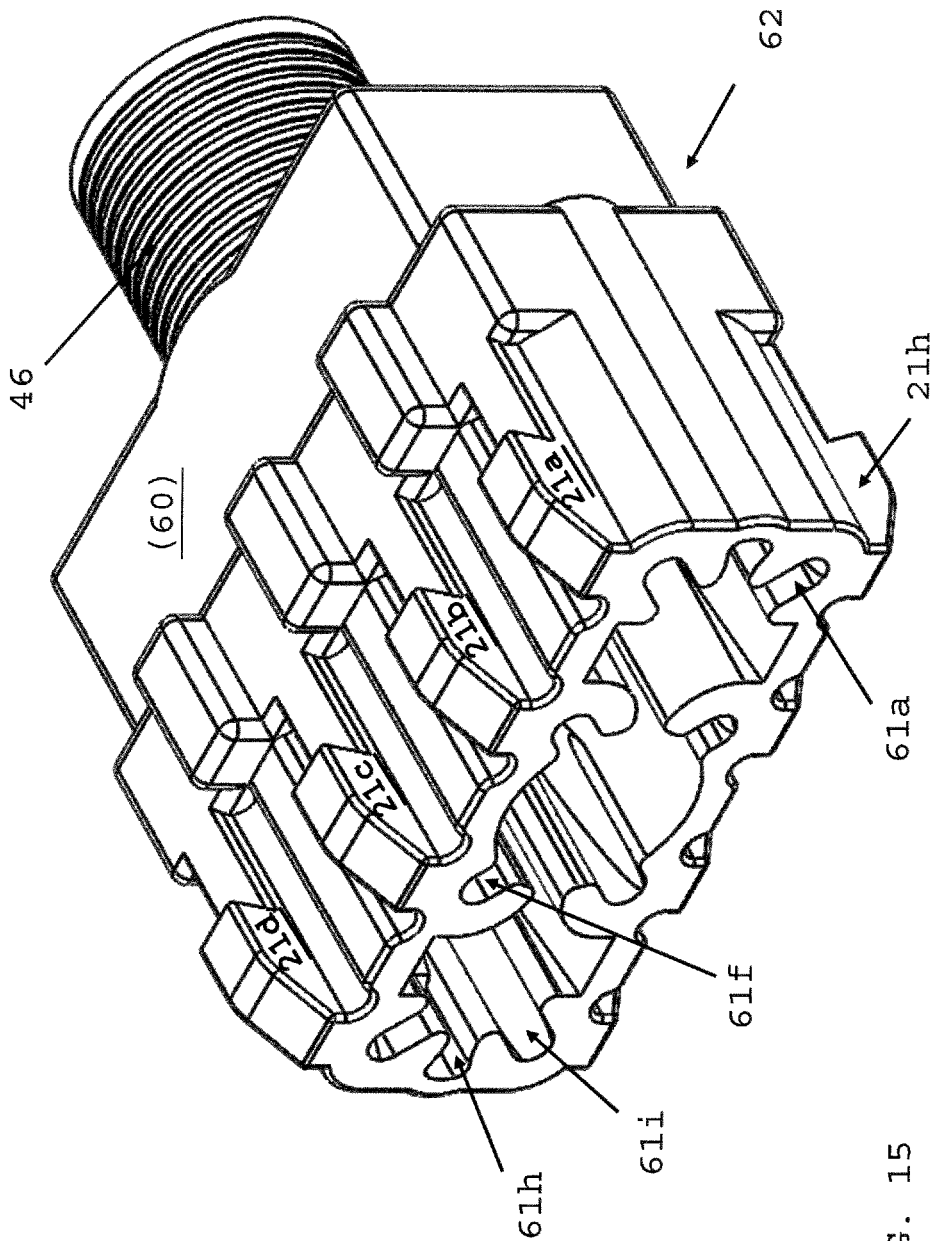
FIG. 15 is a front-side view of the back body and fiber management enclosure combined or integrated together.
Figure 16:
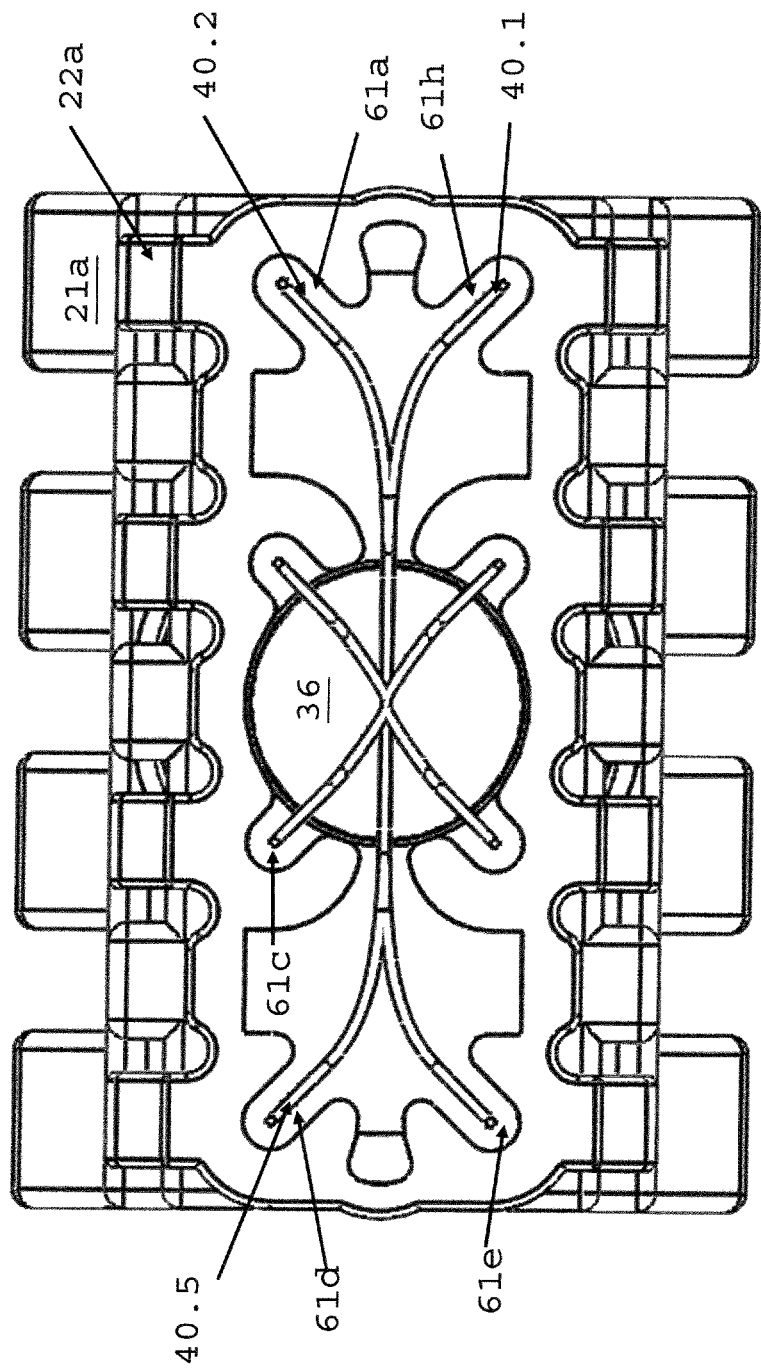
FIG. 16 is a front-end view of the back body with the plural of optical fibers positioned within the combined or unitary upper and lower channels of FIG. 15.

FIG. 3 depicts individual optical fibers secured within upper channel (12) and lower channel (13) of optical fiber management enclosure (10). Input port (36) feeds a plural of optical fiber (40) from a fiber optic cable. Back body (20) holds fiber optic management enclosure (10) in this first embodiment of the present invention. The second embodiment is depicted in FIG. 15 and FIG. 16. The plural of optical fiber are routed and managed from port (36) along upper channel (12) and retained and managed within lower channel (12) until the optical fiber is spliced with an optical fiber at the distal end of the ferrule called a pigtail. When connector (100) is assembled (refer to FIG. 9), fiber optic management enclosure (10) is secured within back body (20), as shown in FIG. 4. FIG. 4 is an exploded view of FIG. 2. FIG. 4 depicts fiber optic management enclosure (10) comprising individual middle wall recess (11*a*-11*d*) for each optical fiber assembly (49) front body middle wall (42.1), lower channel (13), and upper channel (12) that separates incoming bundle of optical fibers (40) into individual optical fiber and holds the optical fiber therein. Back body (20) keeps the optical fibers from becoming dislodged from the upper and lower channels when the enclosure (10) is secured within back body (20).

Figure 5:
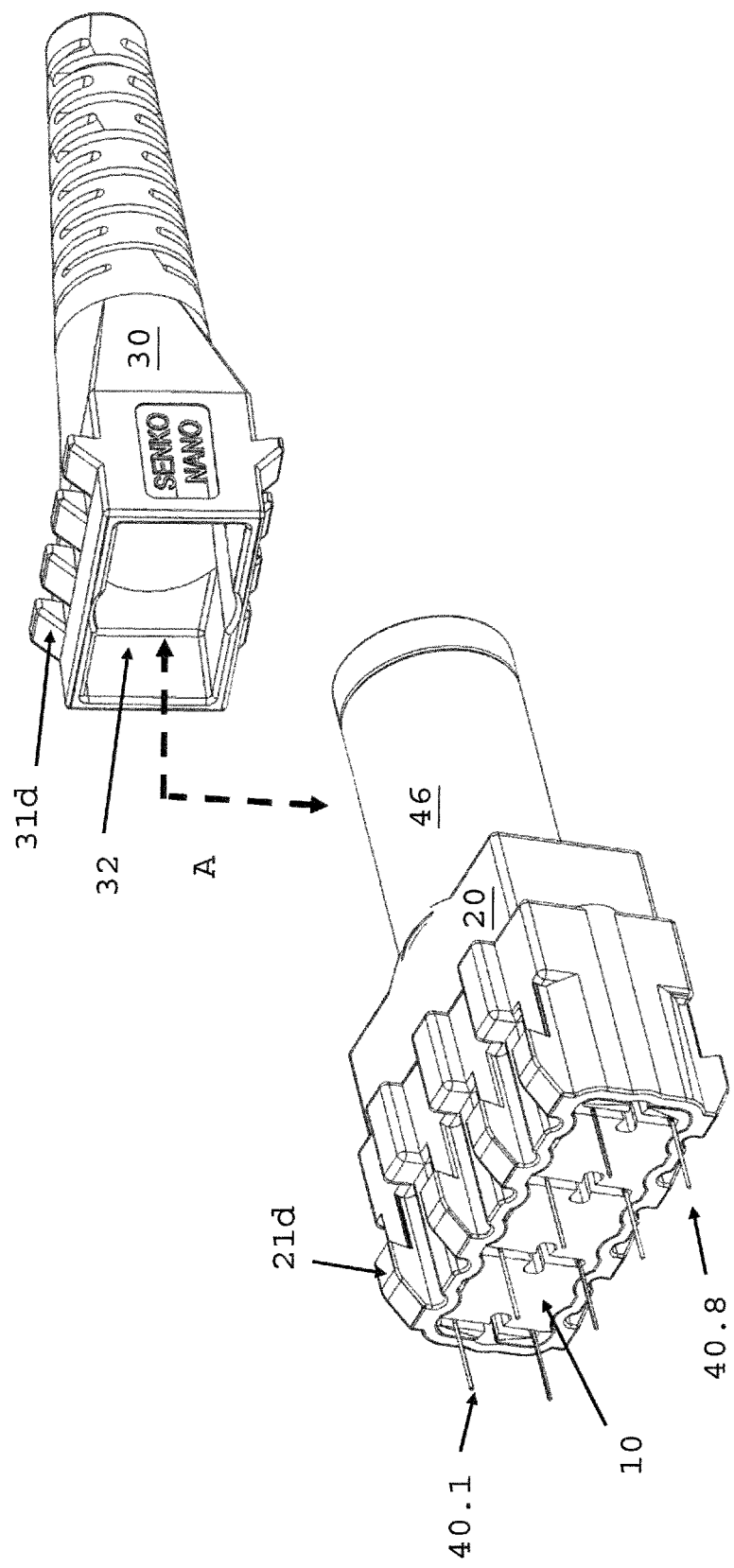
FIG. 5 is an exploded view of inserting the back body of FIG. 2 into the proximal end of a strain relief boot.
Figure 6:
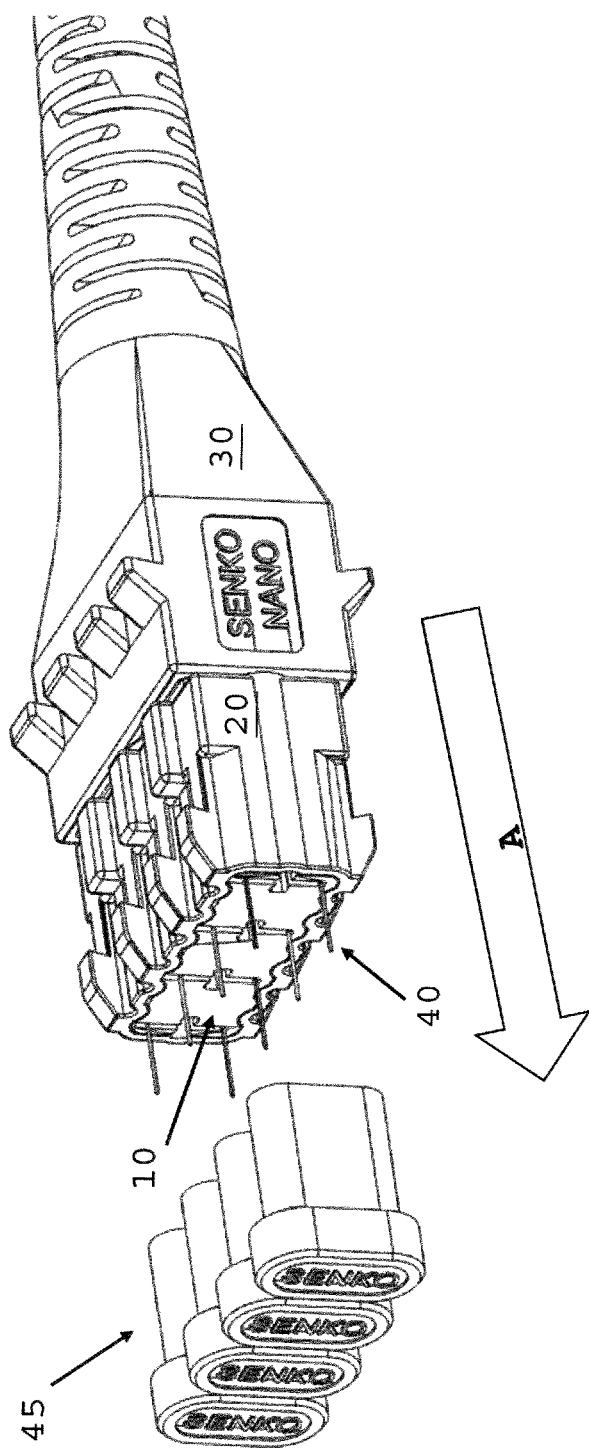
FIG. 6 is an exploded view of dust caps prior to insertion at the proximal end of an assembly of the present invention.

FIG. 5 depicts an exploded view of back body (20) with fiber optic management enclosure (10), optical fibers secured within channels (12, 13), and crimp ring (46) at distal end of back body (20). Back body (20) is inserted and secured within cavity (32) formed at proximal end of strain relief boot (30) as shown by arrow "A". Strain relief boot (30) has plural of opposing outer connector housing latch (31a-31d). Latches (31a-31d) are accepted and secured within openings at distal end of connector outer housing (43), which secures the relief boot (30) with fiber optic management enclosure (10) therein to connector outer housing (43). FIG. 6 depicts an exploded view of dust cap (45) being inserted over assembled FIG. 5, in direction of arrow "A", with fiber optic management enclosure (10) secured with strain relief boot (30).

Figure 10:
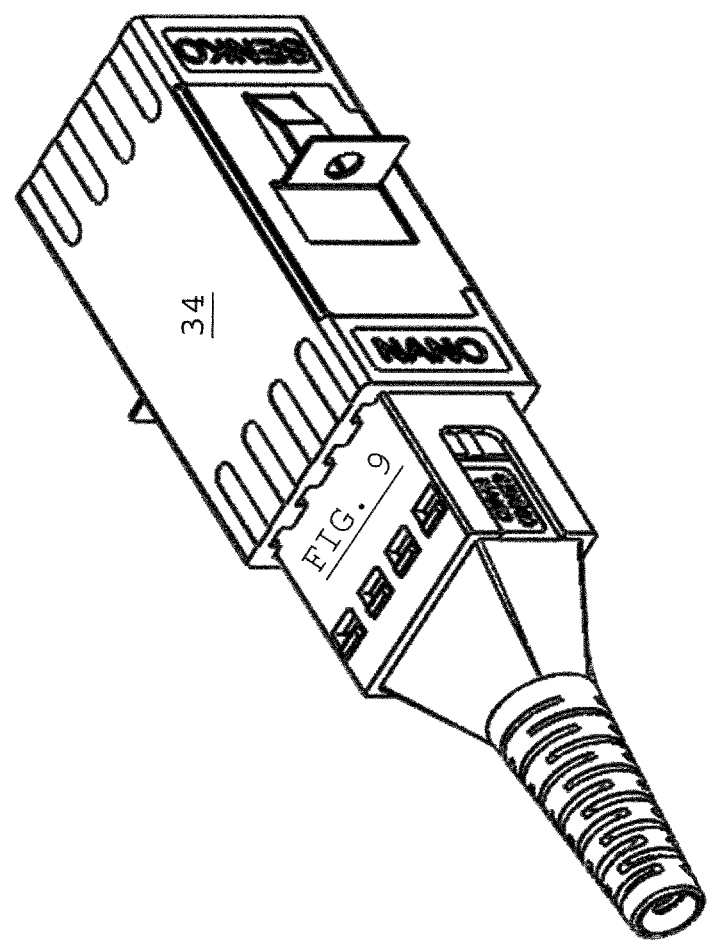
FIG. 10 is the assembled fiber optic connector of FIG. 9 secure within an adapter.

FIG. 7 depicts an exploded view of managed fiber optic connector (100) without back body (20). Optical fibers retained in channels (12, 13) are spliced to ferrule (41) at a distal end. At the distal end of ferrule (41) within fiber optic assembly (49) is a short optical fiber called a pigtail that is spliced with incoming optical fiber (40). Front body (42) is shown accepting bias spring (44) about ferrule (41) and the relative position of fiber optic management enclosure (10) with the front body (42). FIG. 7 further depicts connector outer housing latch (31a-31d) being received with opening (43.2a-43.2d) at the distal end of the connector outer housing (43). Connector outer housing (43) has a plural of opposing alignment key (43.1a-43.1d) on the top of housing (43), and alignment key (43.1e) continues along bottom side of the connector housing, which helps insert connector (100) into adapter (34) without jamming, as depicted in FIG. 10.

Referring to FIG. 7 and FIG. 8, the figures depict assembly of strain relief boot (30) accepting fiber optic assemblies (49) within fiber optic enclosure (10), and outer hook (31a-31d) being secured within opening (43.2a-43.2d) of outer connector housing (43) (noting back body (20) is not shown), which secures the assembly components enclosure (10), fiber assembly (49) and back body (20) with outer housing (43) to form connector (100) along direction of arrow "A".

Referring to FIG. 9, connector outer housing (43) has a plural of opposing openings (43.2a-43.2d) (refer to FIG. 8) configured to accept relief boot (30) to secure back body (20) and fiber management enclosure (10) with connector outer housing (43) to form managed fiber optic connector (100). FIG. 10 depicts assembled managed fiber optic connector (100) inserted into adapter (34).

Figure 11:
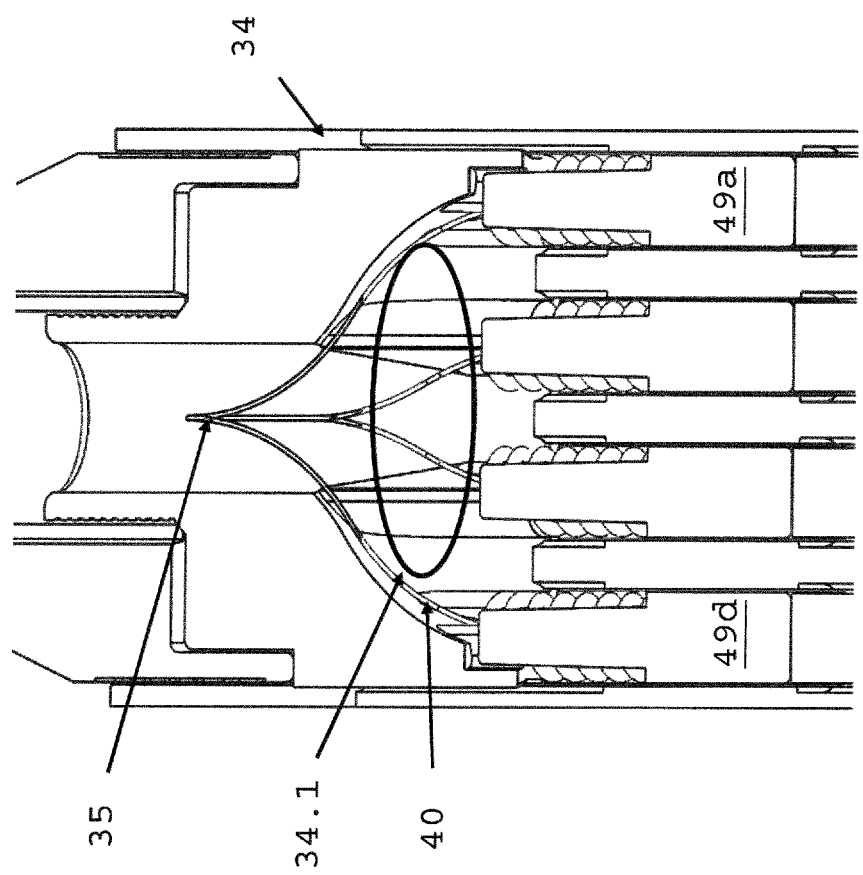
FIG. 11 depicts a prior art deployment of a plural of optical fibers within a connector outer housing.

FIG. 11 depicts prior art optical fiber management system. The bundle of optical fibers enter a prior art connector back body and fan out at breakout point (35) with cavity (34.1). As illustrated there are no channels to separate individual optical fibers. The optical fibers are laid within cavity (34.1) formed in the back body and/or connector outer housing, (as shown in the prior art). During use the optical fibers can become tangled when the user pulls on the fiber optic cable that contains the bundle of optical fibers. By contrast, FIG. 12 depicts deploying fiber management enclosure (10) within back body (20).

Figure 12:
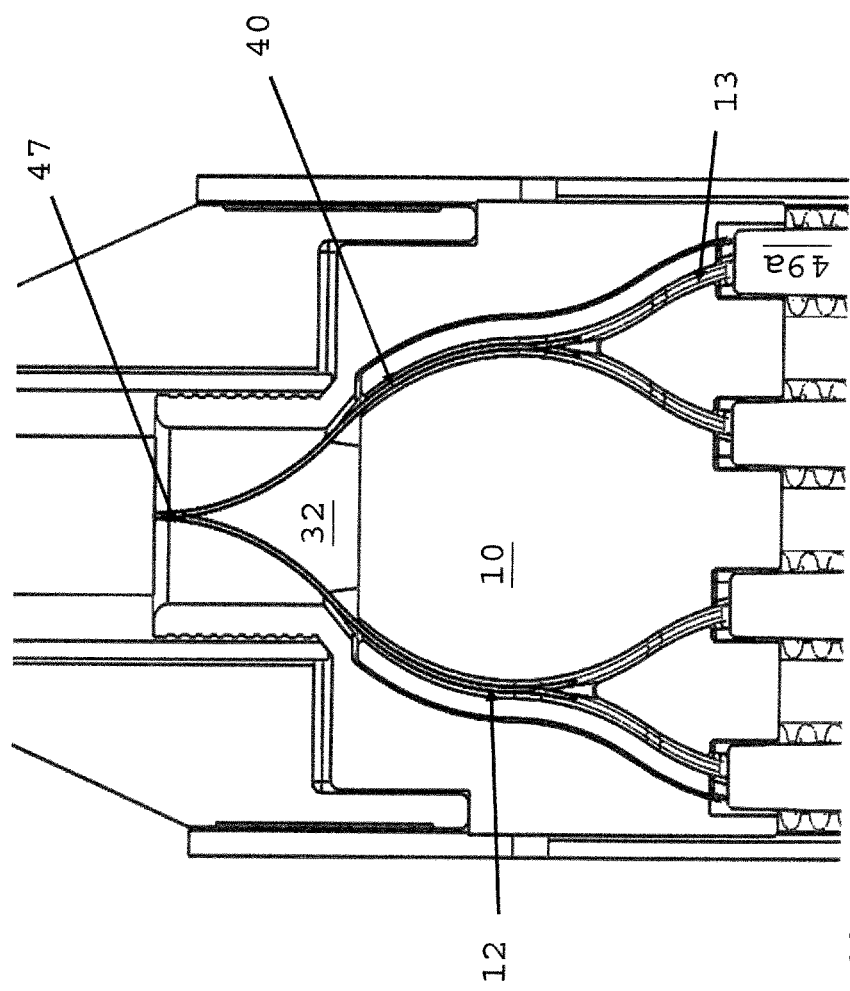
FIG. 12 is a top cut-away view of the fiber management enclosure showing the pathway of the plural of optical fibers received from the fiber optic cable.

FIG. 12 is a top view cut-away illustrating upper channel (12) and lower channel (13) separating bundle of optical fiber (47) into individual optical fiber retained by corresponding channels (12, 13) and spliced to the distal end of the ferrule assembly. Each ferrule assembly has a ferrule housing and ferrule with a short length of optical fiber that is spliced to the optical fibers provided by the fiber optic cable. Fiber optic assembly (49a) is depicted in FIG. 1A.2.

Figure 13:
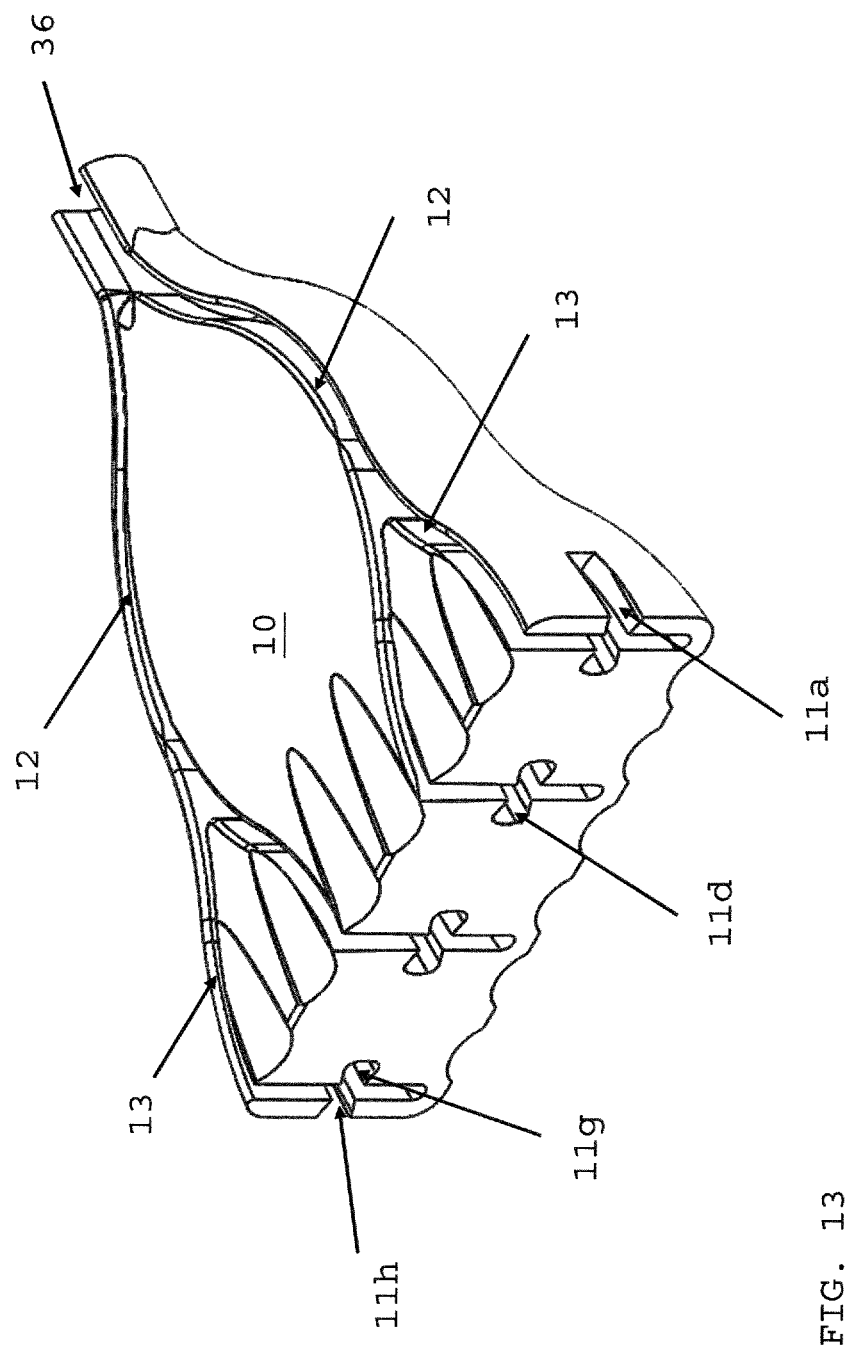
FIG. 13 is top view of the fiber management enclosure.

FIG. 13 depicts optical fiber management enclosure (10). The bundle of optical fiber are placed through opening or port (36) and laid along upper channel (13), then along lower channels (13). Upper channel (12) separates individual optical fiber from the bundle of optical fiber that enter port (36) from a fiber optic cable. Each upper channel (12) separates one or more optical fibers into one or more lower channel (13), and individual front body middle wall (42.1) is secured with corresponding middle wall recess (11), where the individual optical fiber (40) are spliced to a short optical fiber called a pigtail extending from the distal end of the ferrule. (refer to FIG. 17B). After the optical fibers are laid within the channels, enclosure (10) is inserted into back body (20) and the back body aids in retaining the optical fibers within the channels.

Figure 14:
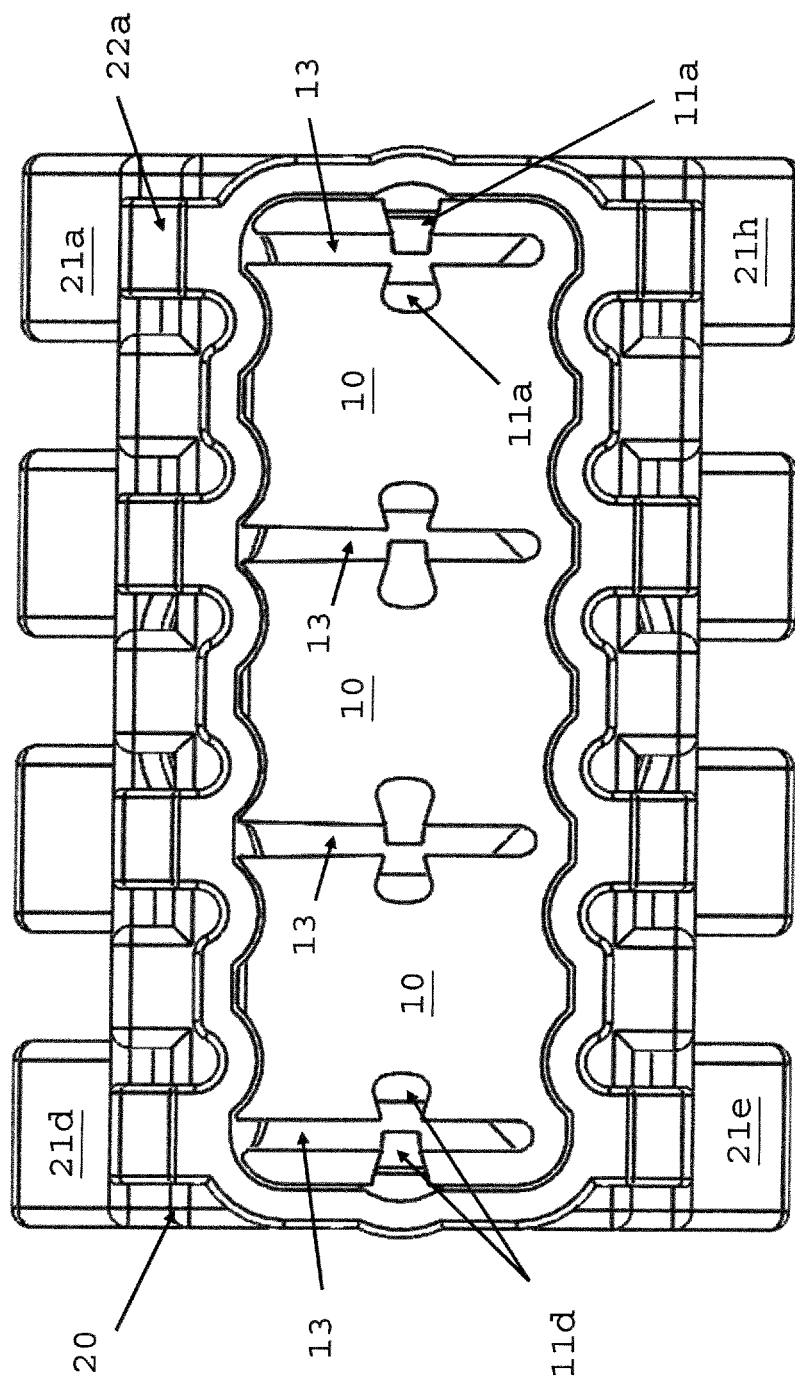
FIG. 14 is a front-end view or proximal end view of the back body with the fiber management enclosure therein.

FIG. 14 depicts a front end view of fiber optic management enclosure (10) retained within back body (20). Middle wall recesses (11a-11d) accept fiber optic connector assembly (FIG. 1A.2) middle wall (42.2) to position the plural of fiber optic assembly at the proximal end of the enclosure (10). Lower channels (13) retain and guide optic fiber (40) from, (a pair of optical fiber for a two ferrule fiber optic connector as depicted in FIG. 1A.2), upper channel (12) via port (36) that accepts a bundle of optical fibers from the fiber optic cable. Inner front body (42) hook (21a-21h) are accepted in a corresponding front body opening (42.3) (refer to FIG. 1A.2). This secures back body (20) to front body (42) of each fiber optic assembly which is in turned secured by strain relief boot (30) to form connector (100) as described above.

FIG. 15 depicts alternative embodiment of the present invention. Back body (20) and optical fiber management enclosure (10) is combined forming integrated, one-piece fiber optic management assembly (60). Upper channel (12) and lower channel (13) are combined into unitary channel (61). FIG. 15 depicts a front view of assembly (60) that comprises main body (62) with one or more front body retention hook (21a-12h). FIG. 16 depicts integrated fiber optic management assembly (60) with optical fiber bundle (40) composed of individual optical fiber (40.1-40.8) separated and secured by a corresponding unitary channel (61a-61h). As in first embodiment (refer to FIGS. 12-14), port (36) accepts the bundle of incoming optical fibers (40). Recess (22a-22h) accepts inner front body (42) structured to retain the fiber optic connector assembly (49) within integrated enclosure (60) when connector (100) is formed deploying enclosure (60).

FIG. 17A and FIG. 17B depict a network topology. FIG. 17A is a prior art network connecting first network (58.1) with second network (58.2) with trunk (50). Four-port transceiver (56.1) delivers optical signal and each signal is delivered to fiber optic connector (57.1-57.8) from first MPO connector (59.1). Each optical fiber (40) is consolidated within a cavity of first cassette (51.1). The cavity holds the plural of optical fiber from LC/DX fiber optic connectors (57.1-57.8). The optical fibers are laid in cassette body (51.1, 51.2), and spliced to second MPO connector (59.2) that is in optical communication with trunk line (50). Third MPO connector (59.3) is configured to break out the plural of optical signals from trunk line (50) and then reconnect to a corresponding optical fiber connector (57.5-57.8). A second cassette (51.2) consolidates the optical fibers from the third MPO connector (59.3). The optical fibers (40) are spliced to a corresponding LC/DX fiber optic connector (57.5-57.9) are in optical communication with fourth MPO connector (59.4). The fourth MPO connector is in optical communication with a second transceiver (56.2). Transceiver may be a PSM4, DR4 or SR4 configuration. Reading FIG. 17A from left to right, there are four MPO connectors, eight LC/DX fiber optic connectors and two cassettes. Optical fibers are loosely placed in the cassette cavity, which lead tangling and breakage of the optical fibers.

FIG. 17B depicts the present invention deploying managed fiber optic connector assembly (100) with the fiber optic management enclosure (10) and back body (20) or integrated fiber optic management enclosure (60) deployed to interconnect the first network (58.1) and second network (58.2) along the trunk line (50). MPO connectors, LC/DX connectors and cassettes, of FIG. 17A, are replaced by connector (100) and a plural of data center connectors (65). All the connectors (65) are of the same type helping to reduce inventory, and simplifying network install. Managed fiber optic connector (100) accepts the optical fibers from the trunk line at a second managed fiber optic connector (100) operatively connected to the second network. As described above connector (100) has optic fiber management enclosure (10) formed as a two-piece assembly with back body (20) or integrated enclosure (10) with back body (20) resulting in a one-piece, integrated fiber optic management assembly (60). The trunk line is a fiber optic cable with a plural of optical fibers. The plural of optical fibers are provided by a fiber optic cable or by a plural of fiber optic connector (65) each operatively connector to another fiber optic connector (65). A first transceiver (56.1) is operatively connector to a plural of fiber optic connectors (65), which are operatively connected to a second plural of opposing fiber optic connectors (65). The second plural of fiber optic connectors (65) have their optical fiber guided by an upper channel and a lower channel or a unitary channel formed as part of fiber optic management enclosure (10) or integrated fiber optic management assembly (60) respectively, which can be used to form managed fiber optic connector (100.1, 100.2). Trunk line (50) interconnects managed fiber optic connector (100.1) and managed fiber optic connector (100.2) to form an optical communication pathway trunk line (50) to interconnect the first network (58.1) with the second network (58.2).

Still referring to FIG. 17B, the removal of cassettes (51.1, 51.2) and plural of MPO connectors (59.1-59.4) simplifies the network topology and construction. The use of fiber optic connectors (65) allows the user to splice and connector only one type of connector not two as in FIG. 17A, the prior art network, using MPO connector (59) and the LC/DX connectors (57). Next, cassette (51) does not provide channels, as in the present invention, that guide, retain and route the optical fibers from a first side of the cassette to the second side of the cassette thereby increasing optical fiber breakage and damage due to tangling of optical fiber together. And if an optical fiber has a latent breakage that at a later date manifests itself, it is much easier for the user to trace the damaged fiber and remove it from the channel (12, 13) than from a tangled group of 100's of optical fibers stuffed into a cavity of a cassette.

Typical prior art, such as U.S. Pat. No. 6,496,648 titled Optical Fiber Cassette, to Andersen assigned to Lucent Technologies, Inc., has a plural of spool walls to wrap optical fiber. The present invention differs in channels one after another continually branch of the plural of optical fiber until the needed optical fiber are positioned at ferrule of the optical fiber connector or optic fiber assembly.

In the above detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be used, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," et cetera). While various compositions, methods, and devices are described in terms of "comprising" various components or steps (interpreted as meaning "including, but not limited to"), the compositions, methods, and devices can also "consist essentially of" or "consist of" the various components and steps, and such terminology should be interpreted as defining essentially closed-member groups. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (for example, "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (for example, the bare recitation of "two recitations," without other modifiers, means at least two recitations, or two or more recitations). Furthermore, in those instances where a convention analogous to "at least one of A, B, and C, et cetera" is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, et cetera). In those instances where a convention analogous to "at least one of A, B, or C, et cetera" is used, in general such a construction is intended in the sense one having skill in the art would understand the convention (for example, "a system having at least one of A, B, or C" would include but not be limited to systems that have A alone, B alone, C alone, A and B together, A and C together, B and C together, and/or A, B, and C together, et cetera). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

Applicant numbering includes 21(a), 21(b) or (a)-(d) for example when there is the same structure that repeats itself. Applicant uses numbering such as front body (42) and then further defines structure to that element by inner wall (42.1).

The invention claimed is:

1. An optical fiber management enclosure comprising:
   a main body having a proximal end portion and a distal end portion spaced apart along a longitudinal axis and a width extending from a first lateral side portion to a second lateral side portion,
   the distal end portion of the main body defining a port for accepting a plurality of optical fibers;
   the main body further defining a plurality of upper channels extending from the port toward the proximal end portion of the main body, each upper channel having a proximal end, the proximal ends of the plurality of upper channels being spaced apart along the width of the main body;
   the main body further comprising at least one lower channel extending from the proximal end of each upper channel to the proximal end portion of the main body;
   wherein each upper channel is configured to guide at least two of the plurality of optical fibers from the distal port to the at least one lower channel extending from the proximal end of said upper channel, and
   wherein the main body is configured to hold each of the plurality of optical fibers for being secured within a respective ferule adjacent the proximal end portion of the main body.

2. The optical fiber management enclosure of claim 1, further comprising a back body having a cavity, the main body being configured to be secured within the cavity of the back body.

3. The optical fiber management enclosure of claim 2, wherein the back body has a top surface, a bottom surface, a plurality of hooks at the top surface, and a plurality of hooks at the bottom surface.

4. The optical fiber management enclosure of claim 3, further comprising an inner front body having a distal end portion defining recesses, wherein the plurality of hooks at the top surface and the plurality of hooks at the bottom surface are configured to latch into the recesses to connect the back body to the inner front body.

5. The optical fiber management enclosure of claim 4, further comprising a strain relief boot for accepting the back body and a connector outer housing for accepting the inner front body, wherein the connector outer housing comprises a plurality of recesses, and wherein the stain relief boot comprises a plurality of hooks configured to be received in the recesses of the connector outer housing to connect the strain relief boot to the connector outer housing.

6. The optical fiber management enclosure of claim 3, further comprising a plurality of inner front bodies, each inner front body having a distal end portion defining top and bottom recesses, each of the plurality of hooks at the top surface and a corresponding one of the plurality of hooks at the bottom surface being configured to latch into the top and bottom recesses of a respective one of the plurality of inner front bodies to connect the back body to the plurality of inner front bodies.

7. The optical fiber management enclosure of claim 5, further comprising a connector outer housing configured to accept the plurality of inner front bodies.

8. The optical fiber management enclosure of claim 6, further comprising a plurality of duplex ferrule assemblies, wherein each inner front body accepts a respective one of the duplex ferrule assemblies and holds the respective duplex ferrule assembly for accepting two optical fibers from a respective lower channel of the main body.

9. The optic fiber management enclosure of claim 1, wherein the plurality of upper channels comprises a first upper channel and a second upper channel, the first upper channel and the second upper channel being substantially equal in length.

10. The fiber optic management enclosure of claim 1, wherein the at least one lower channel extending from the proximal end of one upper channel comprises a first lower channel and a second lower channel, the first lower channel and the second lower channel being substantially equal in length.

11. A fiber optic cable assembly comprising:
    the optical fiber management enclosure of claim 1,
    a back body having a cavity, the main body being configured to be secured within the cavity of the back body,
    at least one inner front body defining a plurality of ferrule retention areas, the at least one inner front body being configured to latch with the back body to connect the back body to the at least one inner front body,
    a connector outer housing configured to accept the at least one inner front body, and
    a plurality of duplex ferrule assemblies, wherein each inner ferrule retention area accepts a respective one of the duplex ferrule assemblies and holds the respective duplex ferrule assembly for accepting two optical fibers from a respective lower channel of the main body.

12. A system of fiber optic connectors comprising:
    a plurality of fiber optic cable assemblies as set forth in claim 11, the plurality of fiber optic cable assemblies including a first fiber optic cable assembly and a second fiber optic cable assembly;
    a trunk line interconnecting the first fiber optic cable assembly and the second fiber optic cable assembly to establish an optical connection between a first network and a second network; and wherein said optical connection between the first network and the second network is devoid of MPO connectors and cassettes.

13. The fiber optic management enclosure of claim 1, wherein the main body has a top and a bottom and each upper channel and each lower channel opens through the top of the main body.

14. The fiber optic management enclosure of claim 13, wherein each upper channel has depth extending downward from the top toward the bottom of the main body and each lower channel has a depth extending downward from the top toward the bottom of the main body, the depth of each lower channel being greater than the depth of each upper channel.

15. The fiber optic management enclosure of claim 14, wherein the depth of each lower channel increases as the lower channel extends from the proximal end of the respective upper channel toward the proximal end portion of the main body.

16. The fiber optic management enclosure of claim 15, wherein each lower channel is configured to hold first and second optical fibers of the plurality of optical fibers such that the respective first and second optical fibers extend proximally from the proximal end portion of the main body at spaced apart locations along the depth of the lower channel.

17. The fiber optic management enclosure of claim 1, wherein the main body has a top and a bottom and a thickness extending from the top to the bottom.

18. The fiber optic management enclosure of claim 17, wherein each lower channel is configured to hold first and second optical fibers of the plurality of optical fibers such that the respective first and second optical fibers extend proximally from the proximal end portion of the main body at spaced apart locations along the thickness.

19. The fiber optic management enclosure of claim 17, wherein the thickness tapers from the proximal end portion to the distal end portion.

20. The fiber optic management enclosure of claim 1, wherein the at least one lower channel extending from the proximal end of each upper channel comprises first and second lower channels, the first and second lower channels extending from the proximal end of each upper channel diverging along the width of the main body as the first and second lower channels extend along the longitudinal axis from the proximal end of the respective upper channel through the proximal end portion of the main body.

* * * * *